(12) United States Patent
O'Brien et al.

(10) Patent No.: US 8,678,482 B2
(45) Date of Patent: Mar. 25, 2014

(54) MOTOR VEHICLE HOOD

(75) Inventors: Keith O'Brien, Highland, MI (US); Paul Sherman, Canton, MI (US); Arthur Whitney, Fenton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/446,293

(22) Filed: Apr. 13, 2012

(65) Prior Publication Data

US 2013/0270870 A1    Oct. 17, 2013

(51) Int. Cl.
*B62D 25/10* (2006.01)

(52) U.S. Cl.
USPC ..................... 296/193.11; 296/1.08

(58) Field of Classification Search
USPC .............. 296/193.11, 1.08, 3; 280/68.1, 68.2, 280/68.3, 69.2, 69.21, 69.24; D12/173
See application file for complete search history.

(56) References Cited

U.S. PATENT DOCUMENTS

| | | | |
|---|---|---|---|
| D399,464 S | 10/1998 | Grabo et al. | |
| D499,992 S | 12/2004 | Chan | |
| D508,665 S | 8/2005 | Chan | |
| D528,482 S | 9/2006 | Hamburger | |
| D545,252 S * | 6/2007 | Chiang et al. | D12/173 |
| 7,234,555 B2 * | 6/2007 | Khouw et al. | 180/68.3 |
| D563,303 S | 3/2008 | Hatter et al. | |
| D575,208 S | 8/2008 | Shelby | |
| 7,699,369 B1 | 4/2010 | Buresh | |
| D640,959 S | 7/2011 | Furst | |
| 8,181,728 B2 * | 5/2012 | Hartland et al. | 180/68.3 |
| 8,302,714 B2 * | 11/2012 | Charnesky et al. | 180/68.1 |
| 2006/0113132 A1 * | 6/2006 | Greenwood et al. | 180/68.6 |
| 2012/0241128 A1 * | 9/2012 | Vacca et al. | 165/44 |

* cited by examiner

Primary Examiner — Dennis Pedder
Assistant Examiner — Beverly Becker
(74) Attorney, Agent, or Firm — Gifford, Krass, Sprinkle, Anderson & Citkowski, P.C.

(57) ABSTRACT

A motor vehicle hood having a non-functional air scoop that appears to be a functional air scoop is provided. The motor vehicle hood can have a module with an opening and a top wall, a bottom wall and a pair of spaced apart sidewalls extending in a first direction away from the opening and providing an enclosure thereof. A grid can be attached to the module across the opening and the grid, top wall and bottom wall can be operatively arranged such that an appearance of an open passageway through the motor vehicle hood is provided when an individual stands a distance away from the hood and looks at the module.

16 Claims, 4 Drawing Sheets

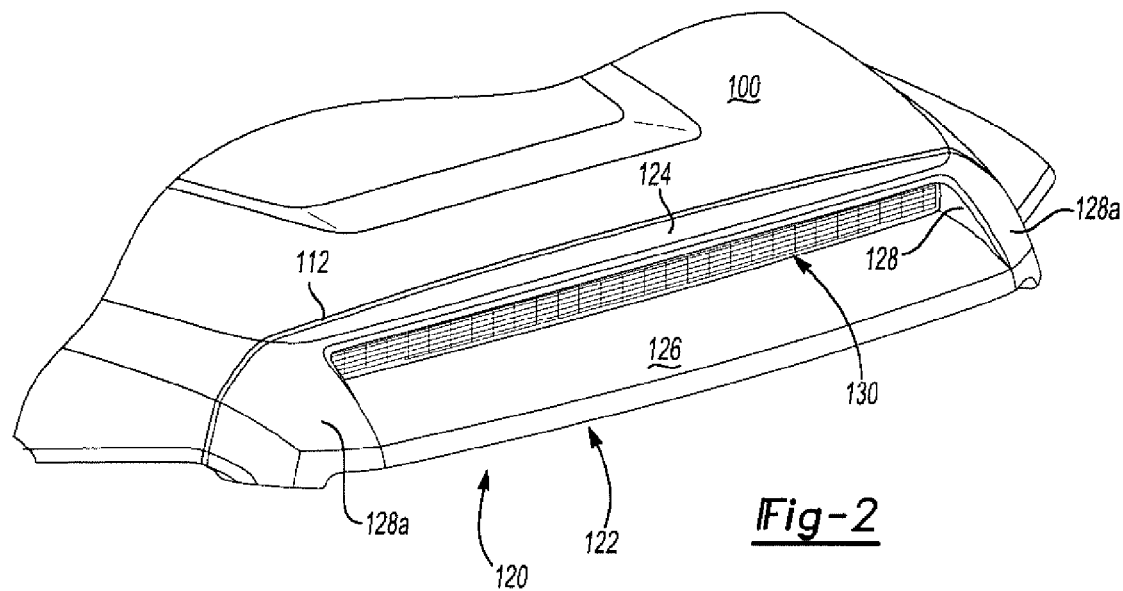
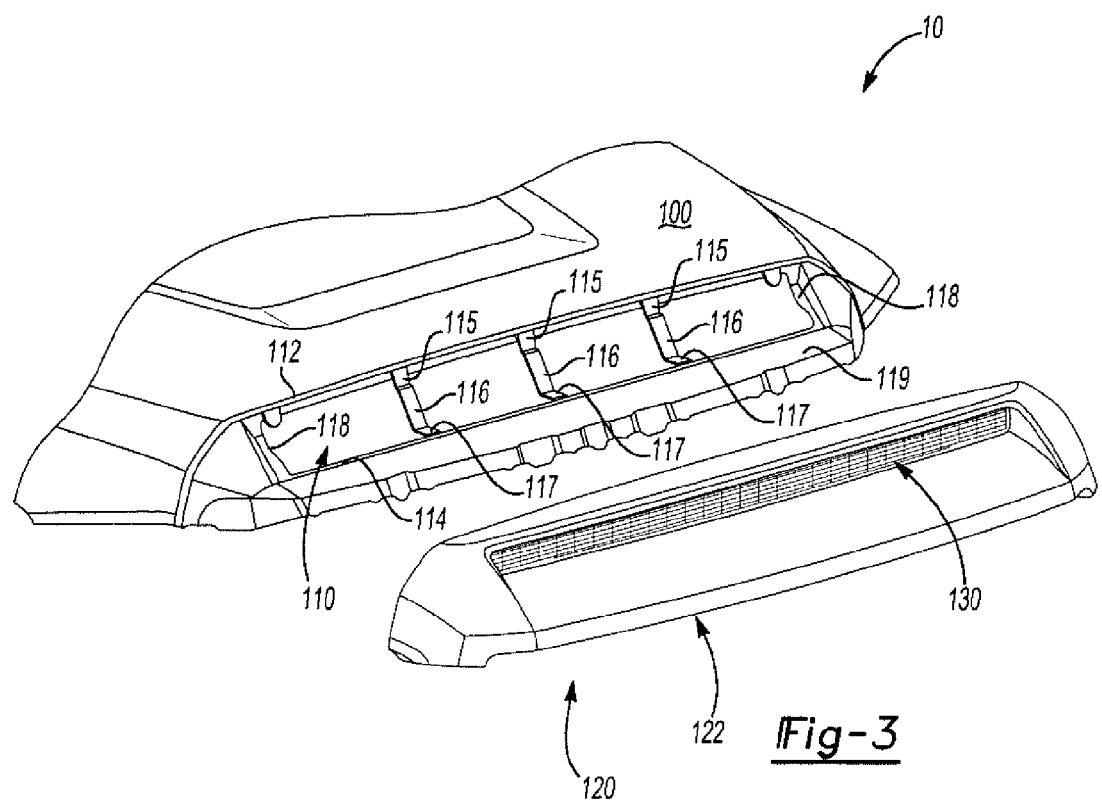

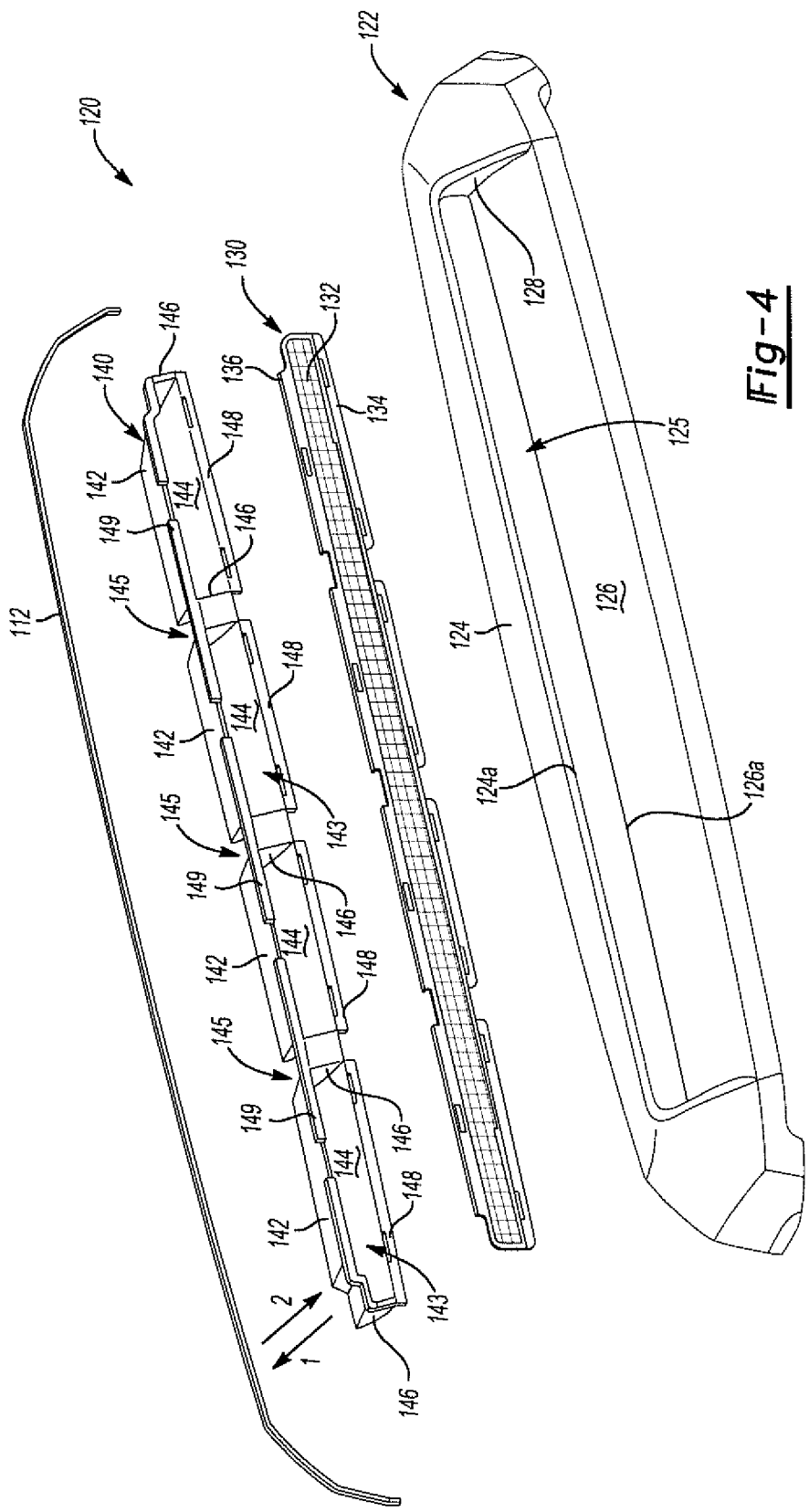

MOTOR VEHICLE HOOD

FIELD OF THE INVENTION

The present invention is related to a hood for a motor vehicle, and in particular, to a hood having a non-functional air scoop.

BACKGROUND OF THE INVENTION

The use of an air scoop as part of a motor vehicle hood is known. In some instances, the air scoop is functional in that it allows air from outside the vehicle to pass through the air scoop and into an engine compartment. In other instances, the air scoop can be non-functional in that it has the shape or appearance of a functional air scoop but does not allow air to pass into the engine compartment. However, heretofor non-functional air scoops have appeared "fake," i.e. to an observer of the motor vehicle and the air scoop it is readily apparent that an open passageway does not exist through the hood. Therefore, a non-functional air scoop design that has the appearance of a functional air scoop design would be desirable.

SUMMARY OF THE INVENTION

A motor vehicle hood having a non-functional air scoop that appears to be a functional air scoop is provided. The motor vehicle hood has a module with a top wall, a bottom wall and a pair of spaced apart sidewalls that bound the top wall and the bottom wall. In addition, the module has an opening with the top, bottom, and pair of side walls extending in a first direction away from the opening and providing an enclosure thereof. A grid is attached to the module across the opening and the grid, top wall and bottom wall can be operatively arranged such that an appearance of an open passageway through the motor vehicle hood is provided when an individual stands a distance away from the hood and looks at the module. In some instances, the motor vehicle hood is made from a piece of sheet metal and the module is made from a polymer, however this is not required.

The motor vehicle hood can have a generally horizontal aperture extending across a width thereof and the module can be located at least partially within the generally horizontal aperture. The horizontal aperture can have a top edge and a bottom edge with at least one support member having a top end attached to the top edge and a bottom end attached to the bottom edge of the aperture. As such, the at least one support member extends in a generally vertical direction across the horizontal aperture and can provide structural support to the piece of sheet metal approximate to the horizontal aperture.

In order to accommodate the at least one support member, the module can have at least one indentation that extends in a second direction that is opposite the first direction, and the at least one indentation can be positioned for the at least one support member to fit therewithin when the module is located at least partially within the generally horizontal aperture of the motor vehicle hood.

The top wall and the bottom wall of the module can be attached to each other at a predetermined distance in the first direction away from the opening of the module. In some instances, the top wall and the bottom wall can provide a generally V-shaped enclosure and the top wall and the bottom wall may or may not be made from a single piece of polymer. In addition, the bottom wall can extend upwardly at a predetermined angle relative to a horizontal axis when the motor vehicle hood is in a closed position, the upwardly extending bottom wall providing or assisting in providing an image or appearance of an open passageway through the hood.

A process is also included in which a motor vehicle hood artificially appears to have an air passageway for air to pass therethrough and enter into an engine compartment for the motor vehicle. The process includes providing a motor vehicle hood with a module as described above, attaching the motor vehicle hood with the module to the motor vehicle and having an individual stand a distance away from the motor vehicle and look at the module. The grid, top wall and bottom wall of the module are operatively arranged such that the opening of the module appears to go completely through the hood and afford air to pass from outside the vehicle into the engine compartment.

BRIEF DESCRIPTION OF THE DRAWINGS

FIG. 2 is an enlarged view of the motor vehicle hood shown in FIG. 1 with a module attached thereto;

FIG. 3 is an exploded view of the motor vehicle hood shown in FIG. 2;

FIG. 4 is a further exploded view of the module shown in FIG. 3; and

DETAILED DESCRIPTION OF THE PRESENT INVENTION

A motor vehicle hood that provides an artificial appearance of an open passageway that allows for air to pass from outside a motor vehicle, through the passageway, and into an engine compartment of the motor vehicle is provided. As such, the motor vehicle hood has utility as a component for a motor vehicle.

The motor vehicle hood can have a top wall, a bottom wall, and a pair of spaced apart side walls. The top wall and the bottom wall can extend between the pair of spaced apart side walls such that an opening is created or provided by the top, bottom and pair of side walls. In addition, the top wall, bottom wall, and pair of side walls can extend in a first direction away from the opening and also provide an enclosure of the opening.

A grid can be attached across the opening and a combination of the grid, top wall and bottom wall can be arranged such that an appearance of an open passage through the motor vehicle hood is provided to a person that stands a distance away from the hood and looks at the opening.

In some instances, the motor vehicle hood can be made from sheet metal and a module having the top wall, bottom wall, and pair of side walls can be included and be attached to the hood. In addition, the grid can have a pattern such as a honey cone pattern, a rectangular pattern, and the like. It is appreciated that the grid is an open grid, that is a grid that has openings for air to pass there through.

The motor vehicle hood can have a generally horizontal aperture extending across a portion of a width of the hood and the module can be located at least partially within the generally horizontal aperture. In addition, the generally horizontal aperture of the motor vehicle hood can have a top edge and a bottom edge. In some instances, at least one support member having a top end attached to the top edge and a bottom end attached to the bottom edge can be provided, the at least one support member extending in a generally vertical direction across the generally horizontal aperture and providing structural support to the hood at one or more locations bounding and/or proximate to the generally horizontal aperture. In order to accommodate the at least one support member, the module can have at least one indentation that extends in a second direction that is opposite to the first direction, and the at least one indentation can be positioned for the at least one support member to fit therewithin when the module is located at least partially within the generally horizontal aperture of the motor vehicle hood.

The top wall and the bottom wall of the module can be attached to each other at a predetermined distance from the opening and when viewed in a side cross sectional manner, the top wall and bottom wall may or may not provide a generally V-shape enclosure. In addition, the bottom wall can extend upwardly at a predetermined angle relative to a horizontal axis when the motor vehicle hood is in a closed position on the motor vehicle.

Figure 1:
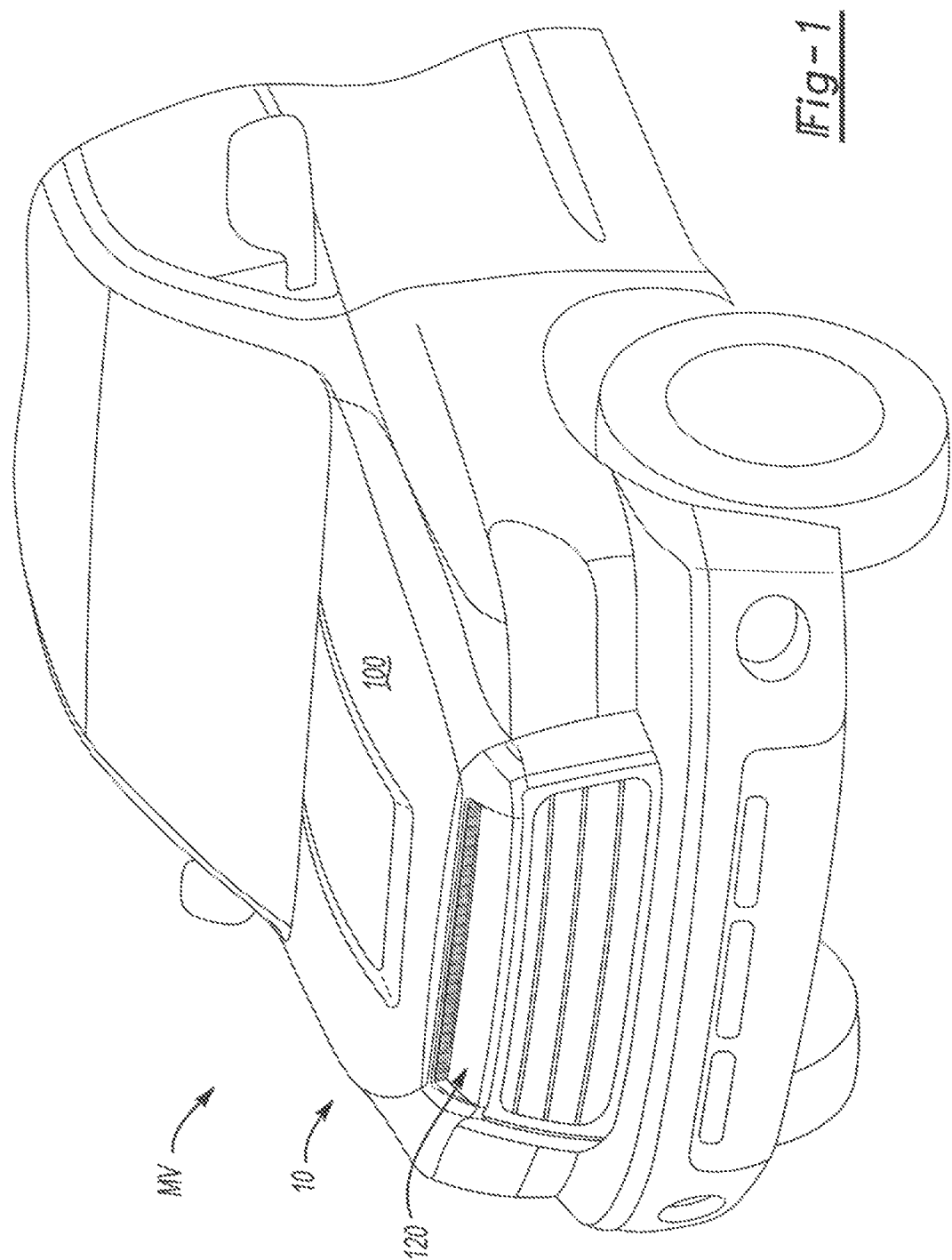
FIG. 1 is a perspective view of a motor vehicle having a motor vehicle hood according an embodiment of the present invention.

Turning now to FIG. 1, a motor vehicle hood according to an embodiment of the present invention is shown generally at reference numeral 10. The embodiment 10 can include a sheet metal hood member 100 attached to a motor vehicle (MV) and the hood member 100 can have a module 120 attached thereto.

FIGS. 2 and 3 illustrate an enlarged view of the sheet metal hood member 100 having the module 120 attached thereto, the module 120 having a module frame 122 as shown more clearly in FIG. 4. The module frame 122 can have a top wall 124 and a bottom wall 126. In addition, the top wall 124 can have a top edge 124A and the wall bottom wall 126 can have a bottom edge 126A. The top wall 124, top edge 124A, bottom wall 126 and bottom edge 126A extend between a pair of side walls 128. In addition, a pair of side portions 128A can be included such that the module frame 122 is complementary with the sheet metal hood member 100 in an aesthetically pleasing manner.

As shown in FIG. 3, the hood member 100 can have a generally horizontal aperture 110, the aperture 110 having a top edge 112 and a bottom edge 114. In addition, a pair of space apart side edges 118 can be included. In some instances, at least one support member 116 can extend in a generally vertical direction and have a top end 115 attached to the top edge 112 and a bottom end 117 attached to the bottom edge 114 of the hood member 100 such that structural support is provided to the hood member in an area or region proximate to the generally horizontal aperture 110.

Figure 5:
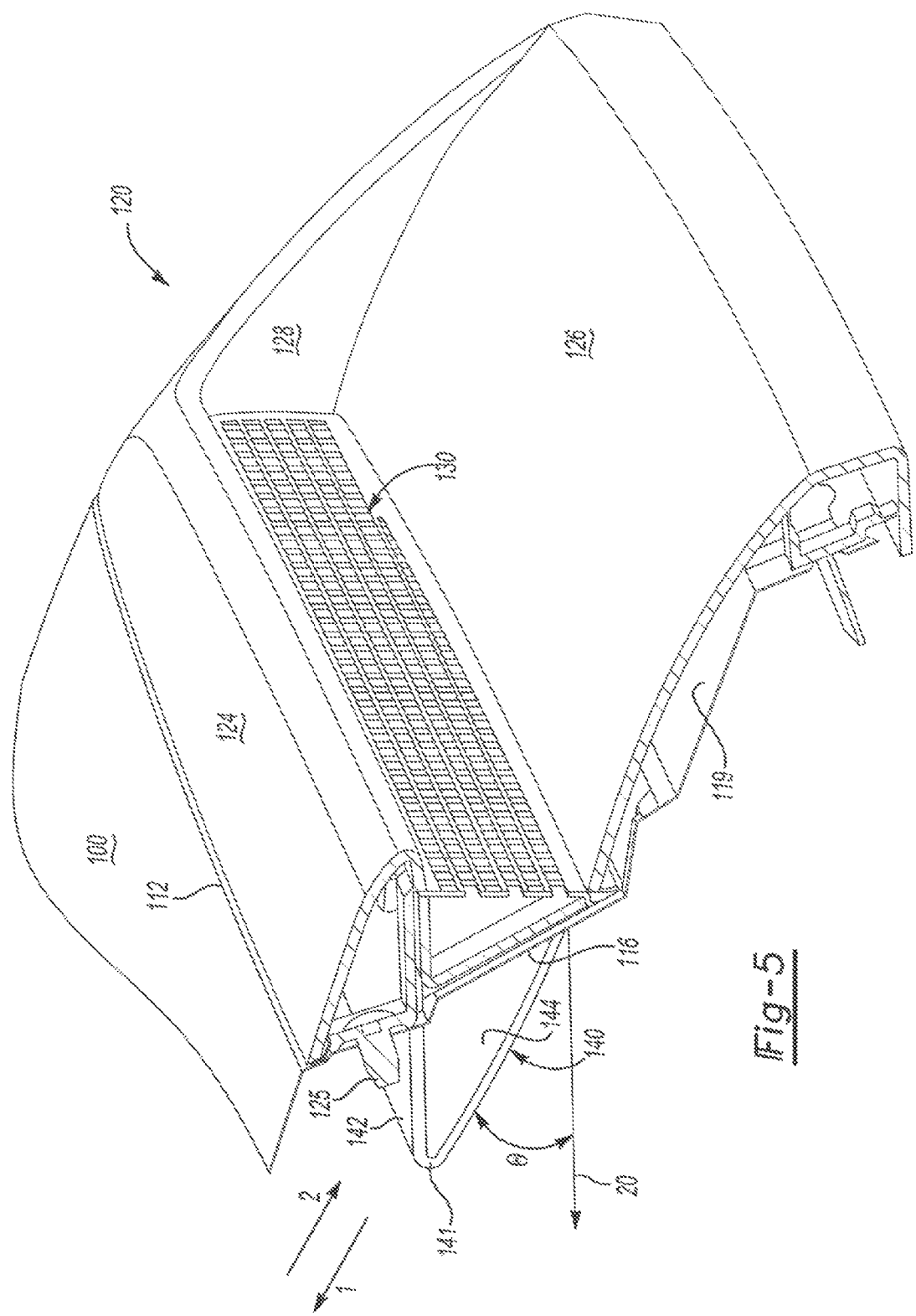
FIG. 5 is a perspective side cross sectional view of the hood and module shown in FIG. 2.

Looking specifically at FIG. 4, an exploded view of the module 120 is shown in which the module frame 122 can also have a generally horizontal aperture 125, across which a grid 130 can be attached. In addition, an enclosure module 140 can be attached behind the grid 130. The enclosure module 130 can have an enclosure top wall 142 and an enclosure bottom wall 144. Between the enclosure top wall 142 and the enclosure bottom wall 144 can be an opening 143 and the enclosure top wall 142 and enclosure bottom wall 144 can extend in a first direction 1 away from the opening 143 and between a pair of spaced apart side walls 146. As shown in FIG. 5, the enclosure top wall 142 and enclosure bottom wall 144 can be attached to each other at location 141 and the bottom wall 144 can extend in an upwardly direction at an angle theta ($\Theta$) relative to a horizontal axis 20.

In order to accommodate the support member 116 of the hood 100, the enclosure module 140 can have at least one indentation 145 that extends in a second direction 2 that is opposite to the first direction 1. It is appreciated that the indentation 145 can be positioned complimentary to the support member 116 such that when the enclosure module 140 is placed at least partially within the generally horizontal aperture 110 of the hood member 100, the support member 116 fits at least partially within the indentation 145. Such an arrangement is shown in FIG. 5 in which the support member 116 is located behind the grid 130 but in front of the attachment location 141 for the top wall 142 and the bottom wall 144.

As can be determined from FIGS. 3-5, the module 120 can be made from a number of separate components, however this is not required. Stated differently, and even though the drawings illustratively show that the module 120 can have a module frame 122, a separate grid 130 and a separate enclosure module 140, the module 120 can be a unitary or integral component having the generally horizontal aperture 125, the grid 130 extending across the aperture 125, the opening 143 and the top wall 142 and bottom wall 144 providing an enclosure of the opening 143 and/or the horizontal aperture 125.

It is appreciated that the grid 130 can be an open grid in that it has openings to which air can pass and thus provides an appearance of an open passageway for air to pass therethrough. In addition, the slanted or angled bottom wall 144 of the enclosure module 140 being inclined upwardly also assists in the appearance of an open passageway. However, it is also appreciated that the enclosure module 140 with the top wall 142, the bottom wall 144 and the pair of spaced apart side walls 146 do not allow air to pass through and into the engine compartment. As such, an artificial passageway is provided for a motor vehicle with the appearance that an open passageway between an outer side or area of the hood to an inner side or area of the hood is present.

The foregoing drawings, discussion and description are illustrative of specific embodiments of the present invention, but they are not meant to be imitations upon the practice thereof. Numerous modifications and variations of the embodiments and thus the invention will be readily apparent to those of the skill in the art in view of the teaching presented herein. It is the following claims, including all equivalents, which define the scope of the invention.

We claim:

1. A motor vehicle hood comprising:
   a motor vehicle hood having a module with an enclosure top wall, an enclosure bottom wall and a pair of spaced apart side walls bounding said enclosure top wall and said enclosure bottom wall;
   said module also having an opening with said enclosure top, enclosure bottom and pair of side walls extending in a rearwardly direction away from said opening and providing an enclosure of said opening, said enclosure bottom wall extending upwardly at a predetermined angle relative to a horizontal axis when said motor vehicle hood is in a closed position;
   a grid attached to said module across said opening;
   said grid, enclosure top wall and enclosure bottom wall forming a non-functional air scoop with an appearance of a functional air scoop with an open passage through said motor vehicle hood when viewed by a person standing a distance away from said motor vehicle hood and looking at said module.

2. The motor vehicle hood of claim 1, wherein said motor vehicle hood is made from a piece of sheet metal and said module is made from a polymer.

3. The motor vehicle hood of claim 2, wherein said motor vehicle hood has a generally horizontal aperture extending across a width thereof, said module located at least partially within said generally horizontal aperture of said motor vehicle hood.

4. The motor vehicle hood of claim 3, wherein said horizontal aperture has a top edge and a bottom edge with at least one support member having a top end attached to said top edge and a bottom end attached to said bottom edge, said at least one support member extending in a generally vertically direction across said horizontal aperture and providing structural support to said piece of sheet metal proximate to said horizontal aperture.

5. The motor vehicle hood of claim 4, wherein said module has at least one indentation extending in a second direction that is opposite to said first direction, said at least one indentation positioned for said at least one support member to fit there within when said module is located at least partially within said generally horizontal aperture of said motor vehicle hood.

6. The motor vehicle hood of claim 1, wherein said enclosure top wall and said enclosure bottom wall are attached to each other at predetermined distance from said opening.

7. The motor vehicle hood of claim 6, wherein said enclosure top wall and said enclosure bottom wall provide a generally V-shaped enclosure.

8. The motor vehicle hood of claim 7, wherein said enclosure top wall and said enclosure bottom wall are a single piece.

9. A process for providing a motor vehicle that artificially appears to have a hood with an air passageway for air to pass through and enter an engine compartment, the process comprising:
   providing a vehicle hood with a module having an enclosure top wall, an enclosure bottom wall and a pair of spaced apart side walls bounding the enclosure top wall and the enclosure bottom wall;
   the module also having an opening with the enclosure top, enclosure bottom and pair of side walls extending in a first direction away from the opening and providing an enclosure of the opening so that air cannot pass through the opening, the enclosure bottom wall extending upwardly at a predetermined angle relative to a horizontal axis when the motor vehicle hood is in a closed position;
   providing a grid attached to the module across the opening;
   the grid, enclosure top wall and enclosure bottom wall forming a non-functional air scoop with an appearance of a functional air scoop with an open passage through the vehicle hood when viewed by a person standing a distance away from the vehicle hood and looking at the module; and
   attaching the motor vehicle hood with the module to a motor vehicle, the vehicle hood having the appearance of having an air passageway that allows air to pass therethrough and enter into an engine compartment of the motor vehicle but the enclosure preventing air from entering the engine compartment.

10. The process of claim 9, wherein the motor vehicle hood is made from of a piece of sheet metal and the module is made from a polymer.

11. The process of claim 10, wherein the motor vehicle hood has a generally horizontal aperture extending across a width thereof and the module is located at least partially within the generally horizontal aperture of the motor vehicle hood.

12. The process of claim 11, wherein the horizontal aperture has a top edge and a bottom edge with at least one support member having a top end attached to the top edge and a bottom end attached to the bottom edge, and the at least one support member extending in a generally vertically direction across the horizontal aperture and providing structural support to the piece of sheet metal proximate to the horizontal aperture.

13. The process of claim 12, wherein the module has at least one indentation extending in a second direction that is opposite to the first direction and the at least one indentation positioned for the at least one support member to fit there within when the module is located at least partially within the generally horizontal aperture of the motor vehicle hood.

14. The process of claim 9, wherein the enclosure top wall and the enclosure bottom wall are attached to each other at predetermined distance from the opening.

15. The process of claim 14, wherein the enclosure top wall and the enclosure bottom wall provide a generally V-shaped enclosure.

16. The process of claim 15, wherein the enclosure top wall and the enclosure bottom wall are a single piece.

* * * * *